Aug. 14, 1934.                A. F. TURANO                1,970,348
                           FISHING REEL MOUNT
                         Filed Nov. 24, 1933        2 Sheets-Sheet 1
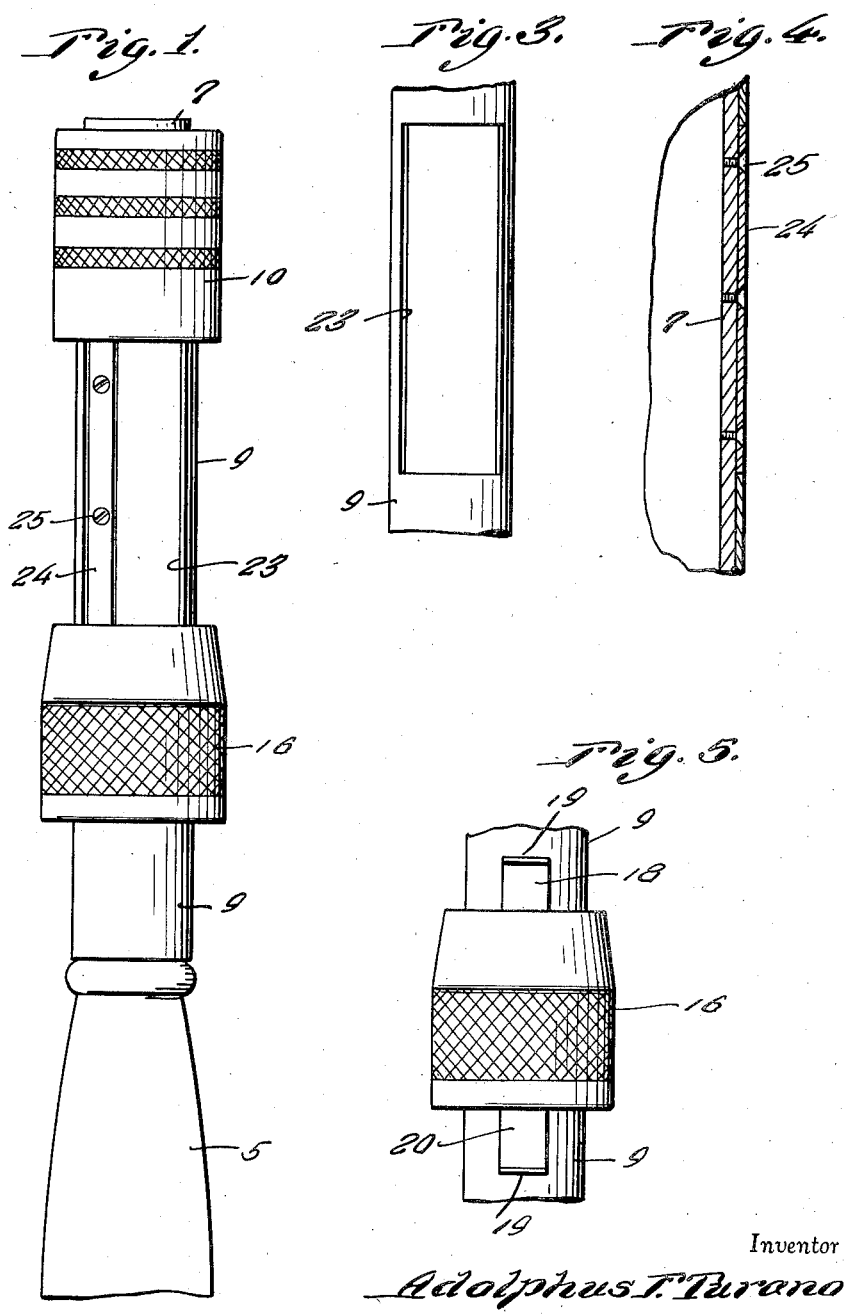

Aug. 14, 1934.   A. F. TURANO   1,970,348
FISHING REEL MOUNT
Filed Nov. 24, 1933   2 Sheets-Sheet 2
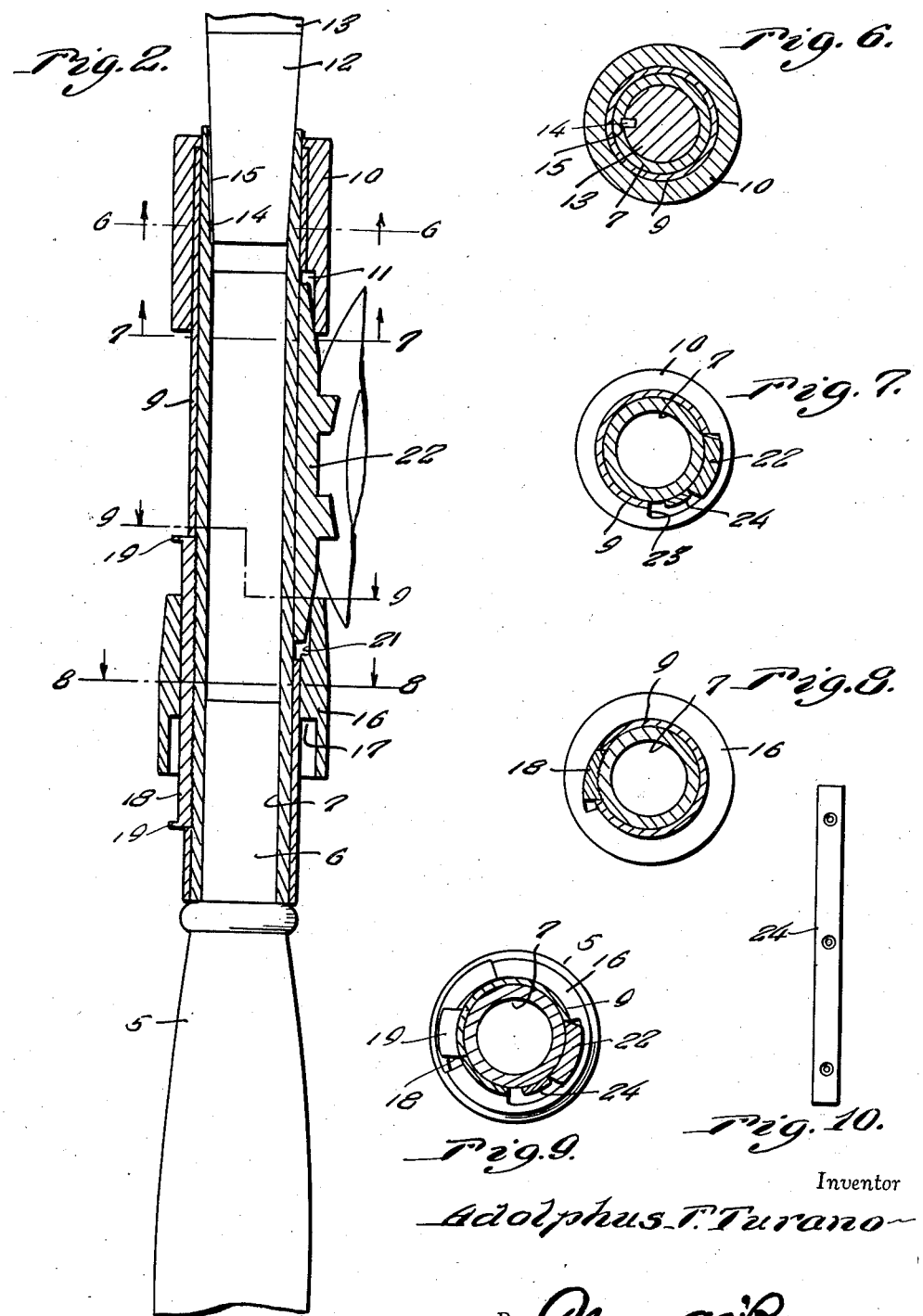
Inventor
Adolphus F. Turano
By Clarence A. O'Brien
Attorney Patented Aug. 14, 1934

1,970,348

UNITED STATES PATENT OFFICE 1,970,348

FISHING REEL MOUNT

Adolphus F. Turano, New York, N. Y.

Application November 24, 1933, Serial No. 699,600

4 Claims. (Cl. 43—22)

This invention appertains to new and useful improvements in fishing tackle, and more particularly to a novel fishing reel mount. Most types of fishing rods accommodate the fishing reel base by the provision on the rod of a stationary socket and a slidable ring, the socket receiving one end of the base, while the ring is movable on the rod and engages over the opposite end of the reel base and is perhaps retained itself by some cam action with the rod. While in a great number of instances, this form of reel attaching is entirely practical, yet unless the socket is of the exact size to receive a definite size reel base and unless the ring is sufficient to accommodate a particular type of reel base, it is very likely that while the socket end ring will retain the reel against any longitudinal motion on the rod, there is a likelihood that circumferential shifting of the reel base on the rod may occur, this because there is not an absolute snug fit of the reel base at all points in the socket and in the ring.

Therefore, it is the principal object of the present invention to provide a rod construction in the form of retaining means for a reel, whereby any size of reel base will be accommodated and held against movement under strain in any direction, either longitudinally or circumferentially with respect to the rod.

Other objects and advantages of the invention will become apparent to the reader of the following specification.

In the drawings:—

Figure 1 represents a fragmentary side elevational view of the mount in its entirety.

Figure 2 represents a longitudinal sectional view through the mount.

Figure 3 represents a fragmentary side elevational view of the outer sleeve.

Figure 4 represents a fragmentary longitudinal sectional view through the inner sleeve.

Figure 5 represents a fragmentary side elevational view of the cam ring.

Figure 6 represents a cross sectional view taken substantially on the line 6—6 of Figure 2.

Figure 7 represents a cross sectional view taken substantially on the line 7—7 of Figure 2.

Figure 8 represents a cross sectional view taken substantially on line 8—8 of Figure 2.

Figure 9 represents a cross sectional view taken substantially on line 9—9 of Figure 2.

Figure 10 represents an elevational view of the removable abutment strip.

Referring to the drawings wherein like numerals designate like parts, it can be seen that numeral 5 represents the handle end of the rod which has the shank 6 extending therefrom and into the inner sleeve 7. The shank 6 is positively secured to the sleeve 7. Numeral 9 represents a sleeve surrounding the sleeve 7 snugly and this sleeve has the knurled barrel 10 secured at the end remote from the end adjacent the handle 5, the barrel 10 has the reel base end receiving socket 11 therein. The adjacent end of the sleeve 7 is provided with a tapered socket for receiving the tapered end 12 of the first section 13 of the fishing rod, this tapered portion 12 being in the form of a metal tip having a teat 14 extending laterally therefrom and engaged into the slot 15 of the adjacent end of the sleeve 7 so that the rod section will not twist in the sleeve 7 when the handle is being actuated.

Slidable on the outer sleeve 9 is the cam ring 16, knurled on its outer side, and provided with the cam shoulder 17 on its inner side which is rideable against the transversely beveled boss 18 which is of elongated construction and provided with stop constructions 19 at its opposite ends. This boss 18 seats in a longitudinally extending slot 20 in the outer sleeve 9, as clearly shown in Figure 5, which prevents any longitudinal shifting of the same with respect to the sleeve 9. The contacting surfaces of the boss 18 and inner sleeve 7 are corrugated or knurled so that there is no likelihood of the boss slipping on the sleeve 7, when the ring 16 is tightened against the same by cam action. It will be noted that the ring 16 has a pocket 21 therein for receiving the end of the reel base 22 opposite the end which engages into the socket 11 of the barrel 10.

As is clearly shown in Figure 3, the outer shell 9 is provided with a rectangular shaped opening 23 of sufficient length to receive the entire length of the reel base 22. As is clearly shown in Figure 4, the inner sleeve 7 has an abutment strip 24 detachably secured thereto by machine screws 25 or other suitable means and this abutment extends for the full length of the rectangular-shaped opening 23.

It can now be seen that the handle 5 is first turned so that the abutment 24 is to the left of the opening 23 in the sleeve 9. The reel base 22 is now set in the opening 23, resting against the sleeve 7 and the base slid so that one end will engage in the socket 11.

The handle 5 is now rotated in a clockwise direction so that the abutment 24 is moved toward the right. Thus the lateral portions of the reel base are clamped between the abutment 24 and one edge of the opening 23 of the sleeve 9.

The ring 16 can now be slid along the boss 18 and when it has been properly positioned against the adjacent end of the reel base, is rotated so that the cam surface in the pocket 21 will bind against the adjacent end of the reel base and firmly retain the reel against displacement.

The abutment 24 may be detachable or non-detachable and can be secured on sleeve 7 so that it will be to the left or right of the sleeve 9 in the opening 23 in Figure 3. The handle 5 can be rotated clockwise or anti-clockwise so that the abutment 24 is moved either to the left or right.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A mount for reels comprising a pair of sleeves, one rotatable within the other, the outer sleeve having an opening therein for receiving a reel base, and an abutment on the inner sleeve projecting into the said opening and adapted to clamp the reel base between itself and the edge portion of the opening in the external sleeve when one of the said sleeves is rotated with respect to the other.

2. In a fishing rod, a reel mount, said mount comprising a pair of sleeves, one rotatable within the other, a slidable clamp ring on the outer sleeve, a stationary socket on the outer sleeve, said outer sleeve being provided with an opening therein for receiving a reel base, said stationary socket being adapted to receive one end of the reel base, while the clamp ring engages the opposite end of the reel base, an abutment on the inner sleeve projecting into the opening in the outer sleeve and being adapted to clamp the base against one edge of the opening in the outer sleeve when the inner sleeve is rotated, said outer sleeve being provided with a second opening, and a beveled boss with which the said ring cooperates seated within the last mentioned opening and bearing against the inner sleeve.

3. In a fishing rod, a reel mount, said mount comprising a pair of sleeves, one rotatable within the other, a slidable clamp ring on the outer sleeve, a stationary socket on the outer sleeve, said outer sleeve being provided with an opening therein for receiving a reel base, said stationary socket being adapted to receive one end of the reel base, while the clamp ring engages the opposite end of the reel base, an abutment on the inner sleeve projecting into the opening in the outer sleeve and being adapted to clamp the base against one edge of the opening in the outer sleeve when the inner sleeve is rotated, said outer sleeve being provided with a second opening, a beveled boss with which the said ring cooperates seated within the last mentioned opening and bearing against the inner sleeve, and corrugations on the opposed surfaces of the inner sleeve and the said boss to prevent independent movement thereof.

4. In combination, a fishing rod, a handle for the rod, a reel mount, said reel mount including a pair of sleeves, one rotatable within the other, the inner sleeve being interposed between the rod and the handle and secured to the said rod and handle, a socket structure at the rod end of the outer sleeve, for receiving one end of a reel base, the outer sleeve being provided with an opening therein for receiving a reel base, a slidable retaining element on the outer sleeve for engaging the opposite end of the reel base, and an abutment on the inner sleeve projecting into the opening of the outer sleeve and being adapted to clamp the reel base against one edge portion of the opening in the outer sleeve when the said handle is rotated.

ADOLPHUS F. TURANO.